(No Model.)
W. B. CARPENTER.
DEVICE FOR CUTTING METALLIC WAGON AXLES.
No. 268,780. Patented Dec. 12, 1882.
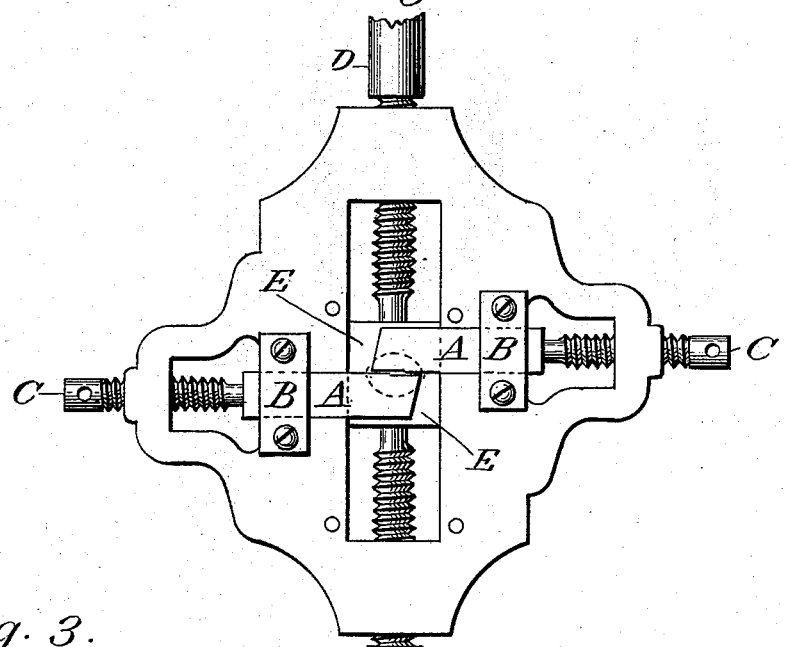
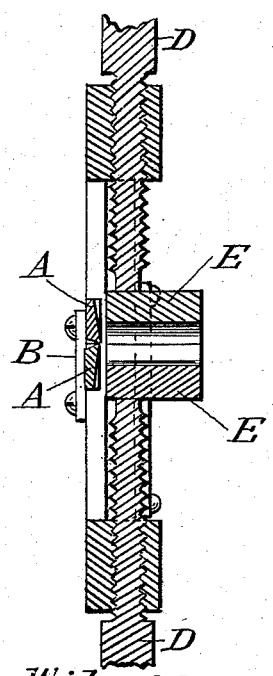
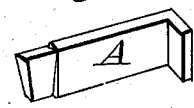
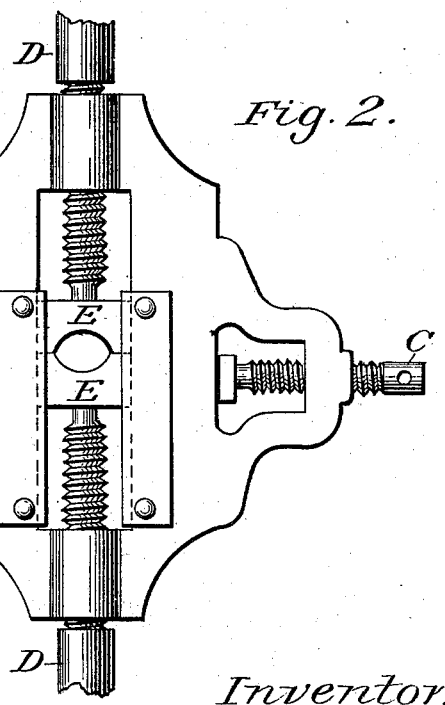
Witnesses:
R. R. Riker
D. P. Dodge
Inventor:
Ward B. Carpenter
By his Atty. T. J. Dean

UNITED STATES PATENT OFFICE.

WARD B. CARPENTER, OF WEST TOPSHAM, VERMONT.

DEVICE FOR CUTTING METALLIC WAGON-AXLES.

SPECIFICATION forming part of Letters Patent No. 268,780, dated December 12, 1882.

Application filed August 1, 1882. (No model.)

*To all whom it may concern:*

Be it known that I, WARD B. CARPENTER, of West Topsham, in the county of Orange and State of Vermont, have invented a new and Improved Device for Cutting and Screw-Threading Metallic Wagon-Axles, of which the following is a specification.

This invention relates to improvements in the construction and operation of a tool for shortening axle-spindles, to compensate for the wearing of the boxes.

The object of my invention is to make a cheap and simple tool to be employed upon any sized spindle.

In the accompanying drawings, which are referred to and made a part of this specification, Figure 1 is a view of the side of the wheel plate or stock containing the cutters; Fig. 2, the side of the wheel-plate, showing the holders; Fig. 3, a sectional view; and Fig. 4 shows one of the cutters.

Similar letters refer to similar parts throughout the several views.

A A represent cutters attached to a wheel-plate by stays B B, and adjusted to the work by set-screws C C.

D D represent the handles of the wheel-plate, of any desired length, which handles also serve as set-screws to adjust the holders E E to the different diameters of axles by passing through the ends of frame and bearing against the sliding holders E E, as shown in Fig. 2. By this arrangement the cutters A A can be adapted to operate upon any axle up to the size of the hole in the wheel-plate.

The cutters A A are held against the shoulder of the spindle by a nut on the end of the spindle crowding against the cutters and by the set-screws C C bearing against the end of cutters A A.

When my invention is properly adjusted to the spindle, revolve the wheel-plate, and the friction between the sides of the cutters and the nut will feed until the proper amount of metal is rapidly cut away. When the spindle has been sufficiently shortened the holders E E are removed from the wheel-plate and the ordinary screw-cutting devices inserted in their place, when the wheel-plate is again applied to the spindle and the screw-thread is cut in the ordinary manner upon the end of the spindle.

Having fully described my invention, what I desire to claim and secure by Letters Patent is—

The improved tool herein described for cutting off wagon-axles and other bars, consisting of the flat wheel plate or stock, the cutters A, applied to one side thereof, and screw C for adjusting the same, the holders E, applied to the other side of said stock, and the screws integral with the handles D, for clamping said holders to the axle, as set forth.

W. B. CARPENTER.

Witnesses:
O. L. WATSON,
W. B. BAYLEY.